W. F. BERETH.
TANDEM DISK HARROW.
APPLICATION FILED NOV. 30, 1915.

1,219,368.

Patented Mar. 13, 1917.
2 SHEETS—SHEET 1.

WITNESS:
INVENTOR:
Wm F. Bereth,
By H. M. Richards,
atty.

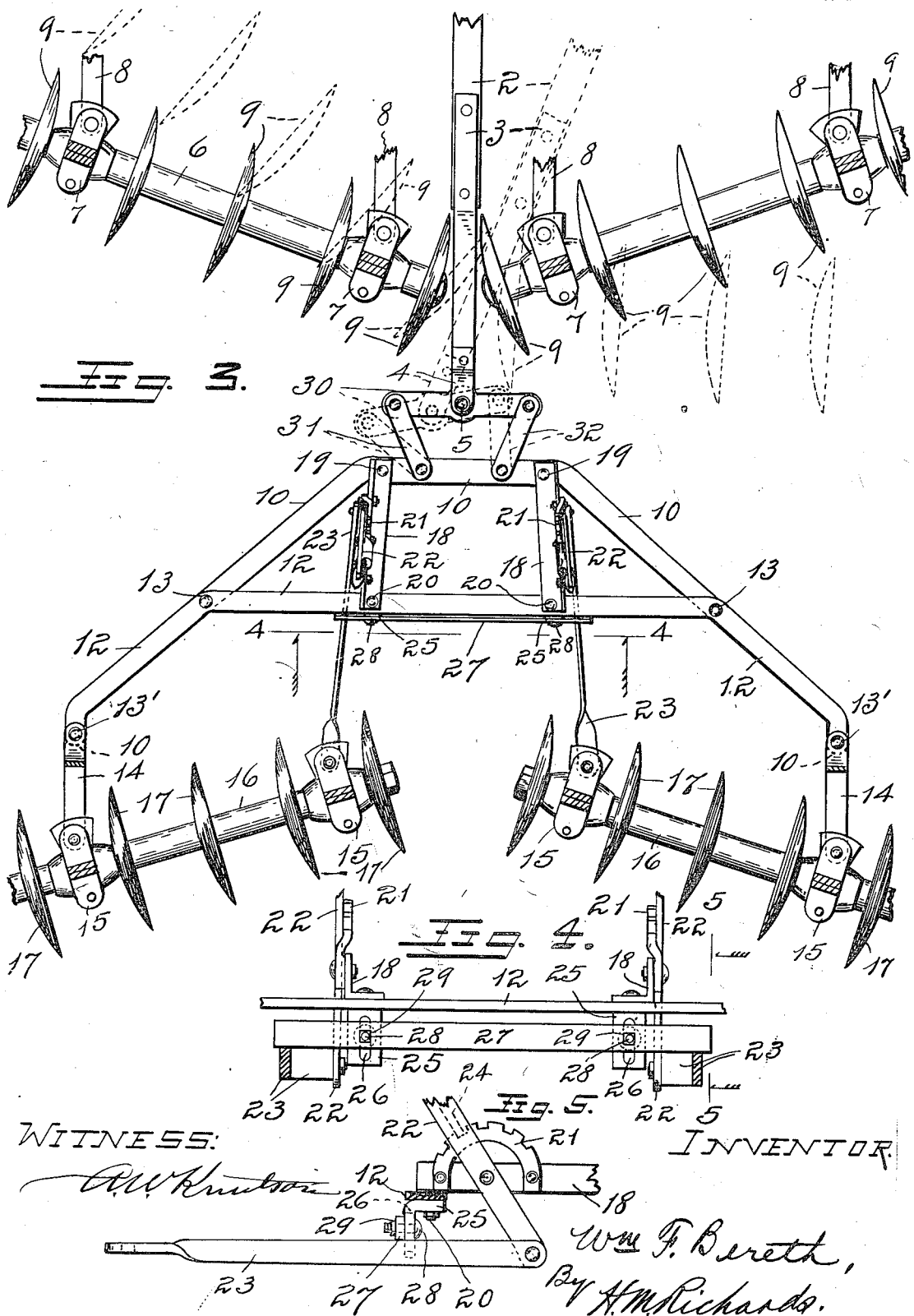

UNITED STATES PATENT OFFICE.

WILLIAM F. BERETH, OF MONMOUTH, ILLINOIS, ASSIGNOR TO MONMOUTH PLOW FACTORY, OF MONMOUTH, ILLINOIS, A CORPORATION OF ILLINOIS.

TANDEM DISK HARROW.

1,219,368.      Specification of Letters Patent.      Patented Mar. 13, 1917.

Application filed November 30, 1915. Serial No. 64,269.

*To all whom it may concern:*

Be it known that I, WILLIAM F. BERETH, a citizen of the United States, and a resident of Monmouth, in the county of Warren and State of Illinois, have invented a new and useful Tandem Disk Harrow, of which the following is a specification.

The invention relates to improvements in general in tandem disk-harrows, and particularly to means for flexibly connecting the front and rear gangs thereof.

The primary object of the invention is to provide a novel coupling between the front and rear gangs (or frames) whereby the act of turning the implement at corners or at the ends of bouts is facilitated, and in order that the soil will not be thrown up in ridges when so turning, and further in order to decrease the torsional stress or side draft on the animals or the tractor.

It is an object to dispose the coupling at a point in rear of the front and in front of the rear gangs of disks, primarily in order to permit said gangs to assume greater angularity when turning as above described.

Minor objects will presently appear, some of which objects will be particularly noted and others of which will be obvious.

The principal end and object of the invention is, therefore, to generally improve the construction and increase the efficiency, capacity and utility of tandem disk plows or harrows.

Figure 1:
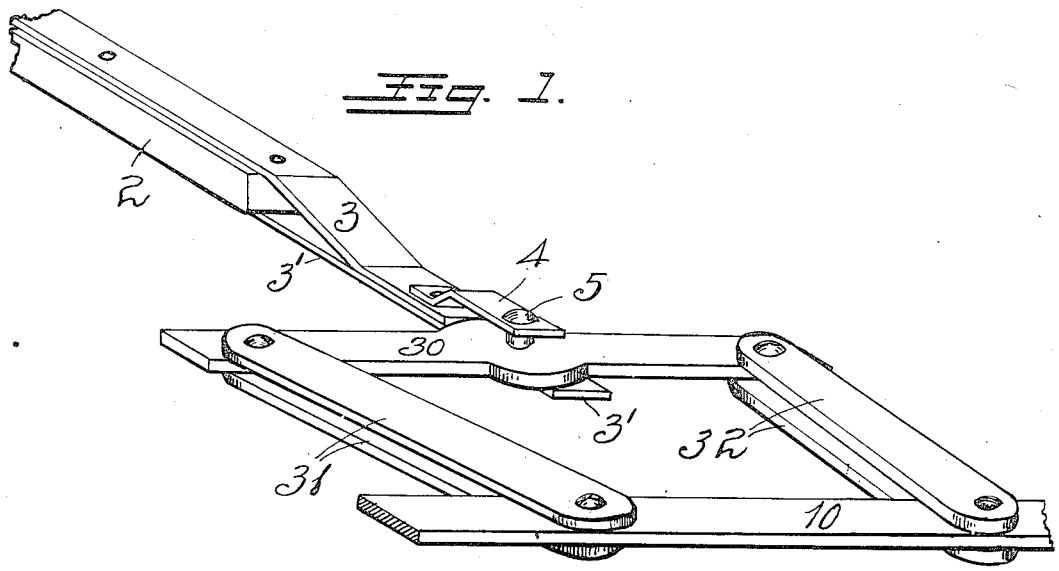
Figure 2:
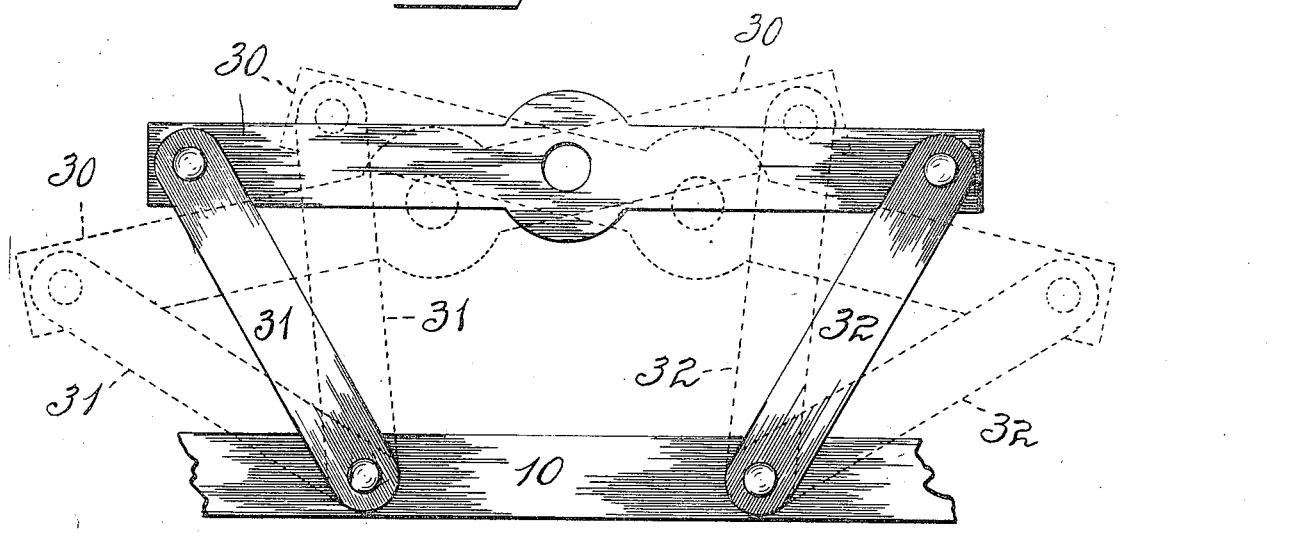

In the accompanying drawing which illustrates a preferred embodiment of my invention:

Figure 1 is a perspective view of the novel coupling or hitch;

Fig. 2, a top plan thereof, illustrating the manner in which it operates;

Fig. 3, a top plan of a tandem disk harrow in which my improvements are incorporated, certain parts of the harrow, unessential hereto being omitted and others broken away;

Fig. 4, a rear elevation, slightly enlarged with reference to Fig. 3, showing the novel means for holding the rear gangs of disks in the ground and for regulating the depth of cutting thereof; and Fig. 5, a detail in side elevation, partly in section in the line 5—5 in Fig. 4.

Coming now to a detailed description of the drawings, and referring to each element and, where necessary, to each part thereof by a distinguishing numeral, 2 indicates the usual tongue to which are bolted straps 3, 3'. 4 designates a hammer strap, and 5 indicates the coupling pin pivotally connecting it with the strap 3. 6, 6 indicate forward disk-shafts, 7, 7 journal-boxes thereon, 8, 8 braces or couplings by which the disk-shafts may be connected to the tongue, and 9, 9, the disks on said shafts. The particular construction of the parts above recited is immaterial.

10 indicates a draft-yoke, and 12 a connecting-yoke secured thereto by bolts or rivets 13, 13'. Links 14 are employed to pivotally connect the rear end portions of the yoke arms 12 with journal boxes 15 mounted on the rear shafts 16 carrying disks 17. 18, 18 indicate angle-iron framebars secured respectively at 19, 20 to the yokes 10 and 12. A toothed segment 21 is bolted or otherwise secured to the vertical arm or branch of each bar 18. Fulcrumed on each of said bars 18 is a lever 22 to the lower end of which is pivoted a coupling-strap 23. 24 designates a locking dog or pawl carried on the lever 22 and coöperating with the segment 21 in the usual manner.

25, 25 indicate angle iron plates each having a vertically arranged slot 26. 27 indicates a regulating-bar adjustable vertically by means of bolts 28 which seat in apertures therein, and which are movable in the slots 26. 29 indicates securing nuts. The elements designated by the numerals 25—29 inclusive are those which govern or control the vertically rising movements of the coupling-straps 23 and thereby the rear gangs of disks.

Pivotally connected to the pin 5 is a swinging-plate 30, and pivotally connected thereto and to the yoke 10 are links in pairs 31, 31 and 32, 32. These links preferably diverge toward the plate 30 and converge toward the yoke.

The operation: Assume the parts to be in the relative positions shown in Fig. 3. Should the tongue and front frame and gangs be turned to the right, as shown by dotted lines in said figure, the rear frame will not be thrust to one side, (thereby throwing the soil into ridges and creating great lateral strain on the tool and added draft on the draft-animals), but the evener 30, 31, 32 will swing to the position indicated by dotted lines in same figure and the rear frame and gangs will advance or progress in a curve, but not until they have advanced a short distance in a straight line. By this action the disks will cut the soil in their usual manner and there will be no jerking or jumping movements thereof, no undue strain thereon, no added draft, and no soil thrown into ridges. Moreover, the coupling is placed in rear of the front gangs of disks, thus permitting the rear gangs of disks to assume much greater angles relative to the front ones than would be the case if the pivotal connection was forward of the front gangs. Again, the draft on the rear gangs is substantially in the same horizontal plane with the disk-shafts—the bars 23 being straight and connected directly to said shafts—whereby a direct or line-draft is attained. It will be noted that if desired, as for hillside plowing, one end of the bar 27 may be adjusted higher than the other, whereby one of the gangs of disks will cut deeper than the other.

The tendency of the rear gangs of a tandem harrow is to creep out of the ground. To obviate this tendency I have provided the plate 27 against which the straps 23 will strike should the rear gangs move upward. And in order to regulate the depth of cultivation I have provided the elements 25, 28 and 29, whereby the plate 27 may be adjusted to and locked in various positions. Adjustments of the rear disk-gangs to provide for greater or lesser angularity may be made in the usual manner by means of the levers 22 and straps 23.

For the purposes of this specification the elements 2, 3, 3' and 4 may be considered as parts of the forward frame.

While the exact construction of a preferred form of my improvements has been herein described, I do not intend by such specific disclosure to be understood as limiting myself thereto, the scope of the invention being pointed out in the appended claims.

Having thus described the nature of the invention I claim as new and desire to secure by Letters Patent the following, to-wit:

1. In a tandem implement, a front frame, a rear frame, a plate pivoted transversely of and to the front frame, and divergent links pivotally connected with said plate and rear frame.

2. In a tandem implement, a front frame, a plate pivoted transversely of and to the front frame, a rear frame including a yoke the front portion of which is substantially parallel with said plate, and links pivotally connecting said plate and that portion of the yoke which paralles it.

3. In a tandem implement, a front frame, a plate pivoted transversely of and to the front frame, a rear frame including a yoke the front portion of which is substantially parallel with said plate, and divergent links pivotally connecting said plate and that portion of the yoke which parallels it.

4. In a tandem implement, a tongue, an element secured thereto and extending rearwardly thereof and in line therewith, a plate pivotally connected with the last recited element and arranged transversely thereof, a rear frame including a yoke the front portion of which substantially parallels said plate, and links pivotally connecting said plate and said portion of the yoke.

5. In a tandem implement, a tongue, an element secured thereto and extending rearwardly thereof and in line therewith, a plate pivotally connected with the last recited element and arranged transversely thereof, a rear frame including a yoke the front portion of which substantially parallels said plate, and divergent links pivotally connecting said plate and said portion of the yoke.

In testimony whereof I hereto affix my signature this 18th day of November, 1915.

WILLIAM F. BERETH.